United States Patent [19]

Komarek

[11] 4,249,878

[45] Feb. 10, 1981

[54] BRIQUETTING PRESS

[75] Inventor: Karl R. Komarek, Chicago, Ill.

[73] Assignee: K. R. Komarek, Inc., Elk Grove Village, Ill.

[21] Appl. No.: 37,867

[22] Filed: May 10, 1979

[51] Int. Cl.[3] .......... A21C 3/00

[52] U.S. Cl. .......... 425/237; 425/367

[58] Field of Search .......... 264/109; 425/111, 237, 425/363, 367

[56] References Cited

U.S. PATENT DOCUMENTS

| | | | |
|---|---|---|---|
| 2,687,699 | 8/1954 | Oakes | 107/12 |
| 3,255,285 | 6/1966 | Chilson | 264/109 |
| 3,969,062 | 7/1976 | Komarek | 425/471 |

OTHER PUBLICATIONS

Gregory, H. R., "The Compaction of Powders", Transactions of Inst. of Chem. Engrs., vol. 20, 1962.

*Primary Examiner*—Donald E. Czaja
*Assistant Examiner*—James R. Hall
*Attorney, Agent, or Firm*—Finnegan, Henderson, Farabow, Garrett & Dunner

[57] ABSTRACT

Briquetting press rolls are provided for rotation in tangential relationship with respect to each other with unequal peripheral velocities at the point of tangency to impose a shear stress on the briquettes of particulate material being formed in cooperating cavities spaced about the peripheral surfaces of the rolls. In one embodiment, the unequal peripheral velocities are provided by rotating rolls of unequal diameter at the same angular velocity. In an alternative embodiment, rolls of constant diameter are rotated by roll driving means at different angular velocities. In both embodiments, the pitch of the cavity spacings is such to ensure registration and cooperation. The shear stress imposed on the briquettes during formation provides briquettes with greater density and strength.

34 Claims, 10 Drawing Figures

BRIQUETTING PRESS

BACKGROUND OF THE INVENTION

1. Field of the Invention

This invention relates to industrial-sized briquetting machines, and more particularly to machines utilizing rotating briquetting press rolls which form briquettes in cooperating cavities on the peripheral surfaces of the rolls.

2. Description of the Prior Art

A briquetting press produces briquettes by compressing particulate material between two cooperating rolls, the peripheral surfaces of which contain cavities into which the particulate material is compressed. In the conventional industrial-sized briquetting machine, two rolls of equal diameter are rotated in opposite directions at the same angular velocities. Cavities in the peripheral surfaces of the rolls complement each other at the point of tangency of the two rolls. Particulate material is fed into these cavities between the rolls and compressed to form briquettes. One type of briquetting press may be seen in my U.S. Pat. No. 4,028,035.

Industrial-sized briquetting presses are frequently used to form briquettes of substantially isotropic materials, such as powdered metals and powdered coal. At high pressure, however, the elastic properties of these materials assert themselves. The symetrical design of the conventional briquetting press rolls stores a great deal of elastic energy which, when combined with frictional forces, may split the resulting briquettes into two halves. This effect is commonly referred to as "clam shelling." Furthermore, briquetting rolls of conventional design tend to impose hydrostatic forces on the material being compressed, and isotropic materials subjected to such hydrostatic forces resist plastic flow. Accordingly, much of the elastic energy of conventional roll-type briquetting machines is wasted by the hydrostatic nature of the pressure in the roll cavities.

It is an imbalance in stress, such as a shear stress, which causes plastic flow in isotropic materials. Of course, if the shear stress exceeds a certain critical value, the materials will fracture; this is particularly the case with crystalline materials. If the shear stress is kept below the critical value, the material will be plastically deformed and produce a briquette of greater density and strength than would have been produced by equivalent hydrostatic pressures.

To date, the difficulty has been to design a briquetting press which incorporates the imposition of high shear stresses into a practical mechanical arrangement. The instant invention has achieved this end by providing briquetting press rolls which are rotated in tangential relationship by an associated roll drive mechanism such that the tangential velocities of the roll are different at the point of tangency, while providing registration and cooperation between the cavities on the tangentially adjacent rolls.

SUMMARY OF THE INVENTION

In accordance with the invention, a pair of briquetting press rolls are provided for rotation in tangential relationship in opposite angular directions by a briquetting press, wherein first and second briquetting press rolls have diameters $D_1$ and $D_2$, respectively, and each has a plurality of briquette-forming cavities spaced about its periphery for registration and cooperation with the cavities of the other roll to form briquettes of particulate material during rotation of the rolls, the spacings of the cavities of said first and second rolls having circumferential pitches $L_1$ and $L_2$, respectively, the rolls conforming to the relationships $$\frac{D_1\omega_1}{L_1} = \frac{D_2\omega_2}{L_2}, \text{ and}$$

$$\omega_1 D_1 \neq \omega_2 D_2,$$

where $\omega_1$ and $\omega_2$ are the angular velocities of rotation of the first and second rolls, respectively, whereby the particulate material in a briquette being formed in a pair of the cooperating cavities in registration is subjected to a combined compressive stress and a shear stress for increasing the strength and density of the briquette.

$\omega_1$ can be equal to $\omega_2$ in which case $D_1 \neq D_2$ and $L_1 \neq L_2$. In the case where $\omega_1 = \omega_2$ it is further preferred that $1.00 > (L_1/L_2) \geqq$ about 0.91, and that $L_1/L_2$ is about 0.95. In the case where $\omega_1 = \omega_2$, the difference in the diameter $D_1$ and $D_2$ should be on the order of one to two times the thickness of the briquettes being formed. Alternatively, the diameter of one roll can be twice the diameter of the other.

Preferably, diameters $D_1$ and $D_2$ are equal and the respective angular velocities, $\omega_1$ and $\omega_2$, and pitches, $L_1$ and $L_2$, are unequal.

It is further preferred that the cavities in each of the press rolls are arcuate, and the ratio of the peripheral lengths of the cavities of the press rolls is equal to about $L_1/L_2$.

Also in accordance with the invention, a briquetting press is provided for briquetting particulate material, which press comprises (a) a pair of press rolls for rotation in tangential relationship in opposite angular directions, each of the rolls having a plurality of briquette-forming cavities spaced about its periphery; and (b) means for moving the periphery of one of the press rolls at a tangential velocity different from that of the periphery of the other of the press rolls at the point of tangency and for providing registration between the cavities on the one press roll with the cavities on the other press roll at the point of tangency, the difference in tangential velocity providing a shear force on the particulate material being formed into briquettes.

The moving means includes the one and the other press rolls having diameters $D_1$ and $D_2$ respectively; the pitches of the cavities on the one and the other press roll being $L_1$ and $L_2$, respectively; and the one and the other press roll being driven at angular velocities $\omega_1$ and $\omega_2$ respectively, and wherein the following relationships are satisfied:

$$\frac{D_1\omega_1}{L_1} = \frac{D_2\omega_2}{L_2}, \text{ and}$$

$$D_1\omega_1 \neq D_2\omega_2.$$

It is preferred that the one and the other press roll have equal diameters, and the pitches of the spacings of the cavities on the one and the other roll are $L_1$ and $L_2$, respectively; and that the press further includes (c) means for driving the one roll at an angular velocity $\omega_1$ different from the angular velocity $\omega_2$ of the other roll, the following relationship being maintained:

$$\omega_1/L_1 = \omega_2/L_2.$$

It is further preferred that the driving means includes a pair of drive shafts, each of the shafts secured to a respective one of the rolls, and wherein the driving means further includes timing gear means coupling the shafts for interdependent rotation.

Still in accordance with the present invention, there is provided a method of manufacturing briquettes of particulate material which comprises (a) positioning first and second briquetting press rolls for rotation in tangential relationship, and having a plurality of briquette-forming cavities spaced about the peripheral surface of each of the first and second rolls, the spacings of said cavities having a circumferential pitch $L_1$ and $L_2$, respectively; (b) rotating the first and second rolls at angular velocites $\omega_1$ and $\omega_2$, respectively, in opposite angular directions to provide registration and cooperation of the first and second roll cavities at the point of tangency of the rolls; (c) feeding the particulate material into the cooperating cavities during rotation of the rolls; and (d) biasing the rolls together at the point of tangency to form the particulate material into briquettes, wherein $$\frac{D_1}{L_1}\omega_2 = \frac{D_2}{L_2}\omega_2, \text{ and}$$

$$\omega_1 D_1 \neq \omega_2 D_2,$$

whereby the forces acting on a briquette during formation in cooperating cavities have compressive and shear components.

Additional purposes and advantages of the invention will be set forth in part of the description which follows, and in part will be obvious from the description, or will be learned by the practice of the invention. The purpose and advantages may be realized and obtained by means of the instrumentalities and combinations particularly pointed out in the appended claims.

The accompanying drawings, which are incorporated in and constitute a part of this specification, illustrate embodiments of the invention, and together with the description, serve to explain the principles of the invention.

DETAILED DESCRIPTION OF THE INVENTION

In accordance with the invention, a pair of briquetting press rolls for forming briquettes of particulate material between the peripheral surfaces of the rolls includes a first rotatable roll having a plurality of briquette-forming cavities spaced about its peripheral surface and a second rotatable roll having a plurality of briquette-forming cavities spaced about its peripheral surface for registration and cooperation with the cavities of the first roll to form briquettes under the action of combined compressive and shear stresses when the rolls are rotated tangentially with respect to each other. A shear force component will be provided when the rolls have a differential surface speed at the point of tangency, that is, when the rolls conform to the following relationship:

$$\omega_1 D_1 \neq \omega_2 D_2$$

where $D_1$, $D_2$ are the diameters of the rolls, and $\omega_1$, $\omega_2$ are the angular velocites of the respective rolls.

By registration and cooperation, I mean that successive cavities on the press rolls will meet at the point of tangency to effect compression and shear on the particulate material captured within the cavities. In other words the situation to be avoided is one in which a cavity on one roll arrives at the point of tangency just as the land between cavities on the other roll arrives. However, because the number of cavities on the two rolls may not be equal, a cavity on one roll may not always register with the same cavity on the other roll. Registration and cooperation will be ensured for the rolls and drive mechanisms of the present invention if the following relationship is maintained:

$$P\omega_1 D_1/L_1 = \omega_2 D_2/L_2$$

where $L_1$ and $L_2$ are the pitches of the spacings of the cavities on the respective press rolls. Pitch is defined as the circumferential distance between one point of a cavity or a space between cavities and the corresponding point on an adjacent cavity or space.

Figure 1A:
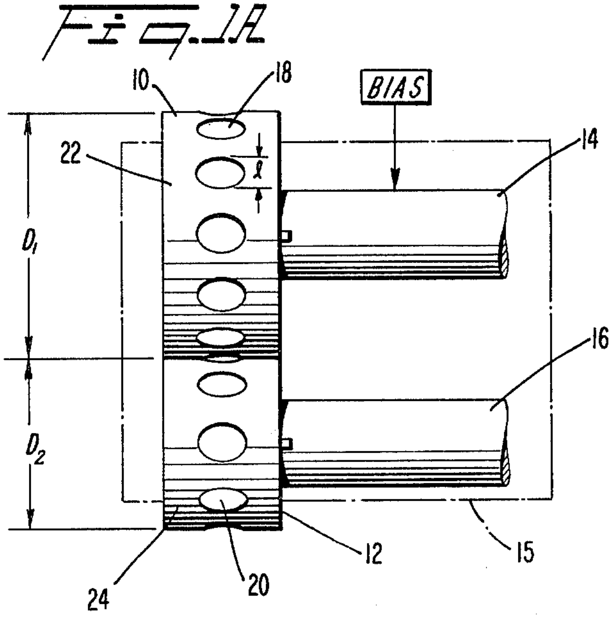
FIG. 1A is a schematic representation of an exaggerated side view of a pair of briquetting rolls in accordance with one embodiment of the invention.
Figure 1B:
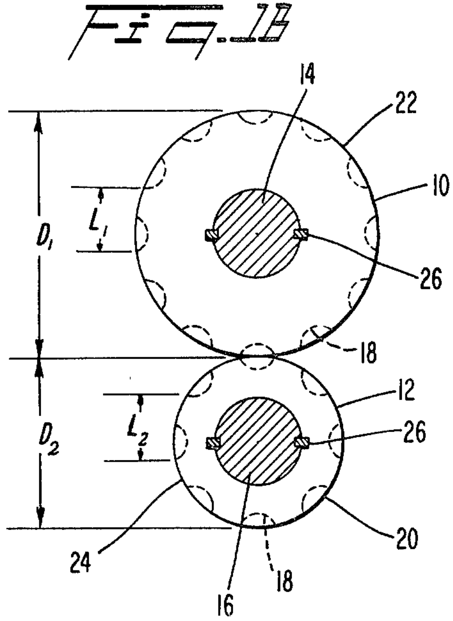
FIG. 1B is an exaggerated end view of the briquetting rolls of FIG. 1A.

In the embodiment depicted in FIGS. 1A and 1B, the rolls are of different diameters and are rotated at the same angular speed, giving rise to different tangential speeds at the respective roll surfaces. A first rotatable roll 10 and a second rotatable roll 12 are depicted schematically, and are shown mounted on shafts 14 and 16 of a conventional briquetting press (not shown). Pluralities of briquette forming cavities 18 and 20 are spaced about the peripheral surfaces 22 and 24 of the rolls 10 and 12, respectively. The pitches of the spacings of cavities 18 and 20 are chosen so that the individual cavities 18 and 20 cooperate with each other substantially at the point of tangency of the rolls to form briquettes when the rolls 10 and 12 are rotated tangentially with respect to each other at the same angular velocity. Given the diameters $D_1$ and $D_2$ of rolls 10 and 12 respectively, the pitches $L_1$ and $L_2$ of the spacings of cavities 18 and 20 should conform to the relationship $D_1/L_1 = D_2/L_2$ to effect registration. $L_1$ and $L_2$ can be calculated as equal to $\pi D_1/N_1$ and $\pi D_2/N_2$, where $N_1$ and $N_2$ are the numbers of evenly spaced cavities on rolls 10 and 12, respectively.

The briquetting press employing the above-described rolls can be otherwise conventional including motor means for rotating the shafts, means for biasing the shafts together at the point of tangency of the rolls, and a frame or base for supporting the various press components. Various briquetting press components, except for the rolls, which could be used with the rolls disclosed herein are described, for example in my previous U.S. Pat. No. 4,028,035.

Figure 2:
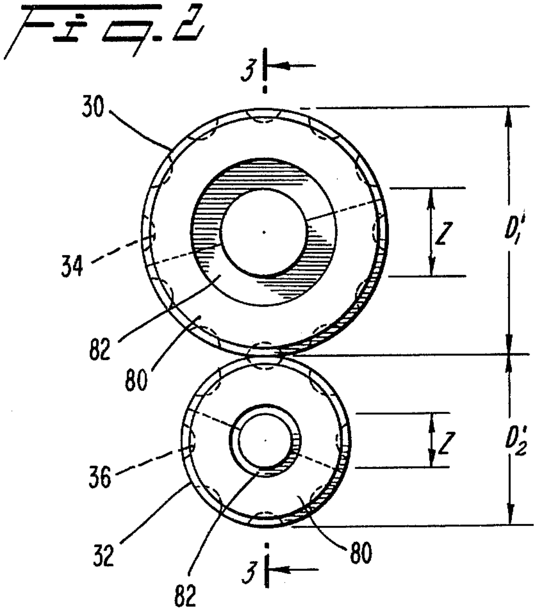
FIG. 2 is an exaggerated end view of a variation of the embodiment of the invention shown in FIGS. 1A and 1B.

As here embodied and depicted in FIGS. 1 and 2, the first roll 10 has a diameter $D_1$ which is larger than the diameter $D_2$ of the second roll 12. There is no significance to the arrangement of the rolls; the roll with the larger diameter may be either the upper or lower roll, or the rolls may be arranged side by side. In FIG. 1A, roll 10 is shown biased against roll 12 as a result of a biasing force applied to shaft 14. The biasing achieves compression of the particulate material. The roll and shafts are depicted as mounted on a suitable frame 15 (shown in dotted lines).

The difference in the diameter of the rolls will affect the relative surface speeds and thus the amount of shear stress imposed on the briquettes being formed in the cooperating cavities 18 and 20. The amount of shear stress which ideally should be imposed on the briquettes depends on the characteristics of the materials being formed into the briquettes and the contents and size of the briquettes being formed. Preferably, the absolute value of the diameter difference $D_1-D_2$ is a function of the thickness* of the briquettes being formed and is of significance in determining the optimum shear stress that may be imposed on the briquettes. Furthermore, since it may be impractical to have different briquetting rolls for each type of material being formed into briquettes, it is more efficient to establish the diameter difference as a function of the thickness* of the briquettes to be formed.

Accordingly, it may be preferred that the absolute value of the diameter difference $D_1-D_2$ be equal to about one to two times the briquette thickness. Other relationships with respect to the diameter difference may be preferred for other considerations. For instance, it may also be preferred to have the diameter $D_1$ of the first roll 10 be twice that of the diameter $D_2$ of the second roll 12. In this case, the pitch $L_1$ of roll 10 can be made exactly twice the pitch $L_2$ of the roll 12 in order to ensure registration.

The embodiment of the instant invention depicted in FIGS. 1A and 1B comprises a pair of complete rolls 10 and 12 having different diameters and preferably includes means for attaching the rolls to the shafts 14 and 16 of a conventional briquetting machine. A common means for attaching, depicted in FIG. 1B, includes large keys 26 inserted into transverse holes in the ends of the shafts 14 and 16. Another common means of attaching briquette rolls to shafts is by heat shrinking the rolls to the shafts, although any other means may be employed which provides non-slip attachment between the shafts and rolls.

A variation of the embodiment of the instant invention depicted in FIG. 1 is a pair of briquetting press roll sleeves for placing around the peripheral surface of existing rolls or roll cores 82 as shown in FIG. 2. This embodiment comprises first and second cylindrical sleeves 30 and 32, having inside diameters Z, but an outside diameter $D_1'$ for first sleeve 30 and an outside diameter $D_1'$ for second sleeve 32. The outside diameters $D_1'$ and $D_2'$ of the two sleeves are different. Each sleeve 30 and 32 has a plurality of briquette-forming cavities 34 and 36 respectively, spaced about its outside peripheral surface for registration and cooperation with the cavities of the other sleeve when the sleeves are rotated on the rolls tangentially with respect to each other at the same angular velocity. The sleeves may be in two or more sections for ease of installation and removal. FIG. 2 shows a pair of sleeves each having two segments.

Figure 4A:
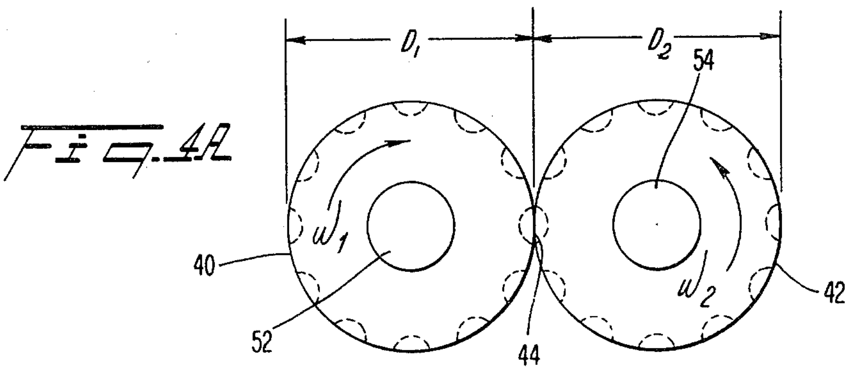
FIG. 4A is an end view of another embodiment of the present invention.
Figure 4B:
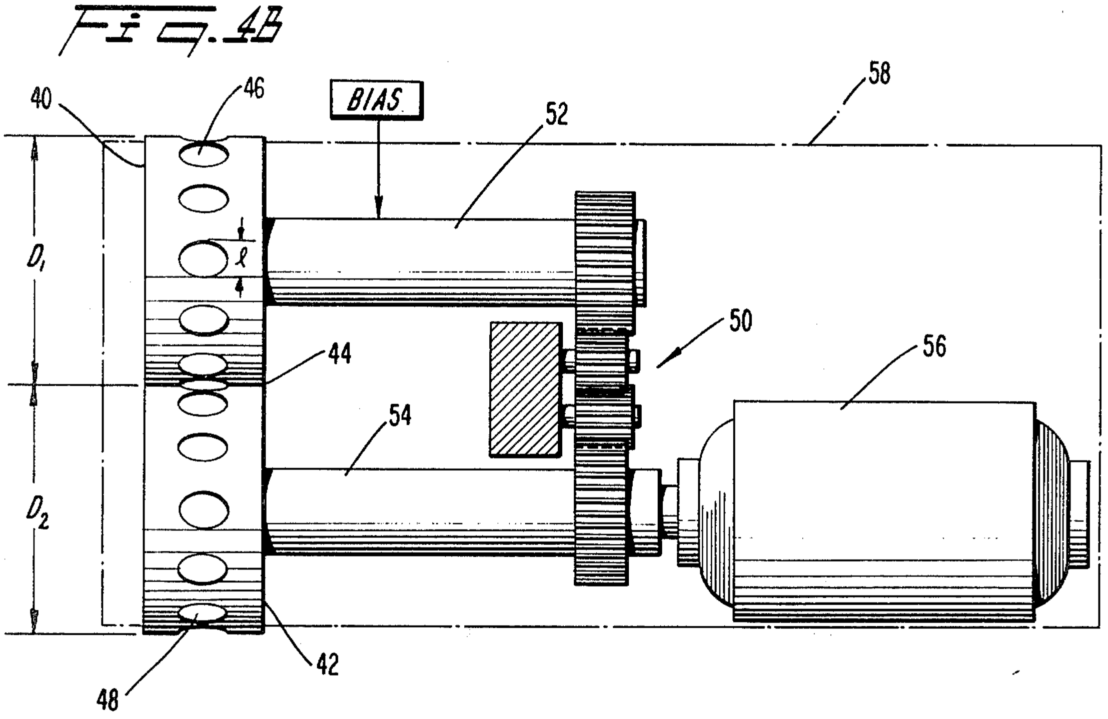
FIG. 4B is a side view of the embodiment of FIG. 4A showing a schematic of the press roll drive apparatus.

In accordance with the invention and as embodied in the apparatus depicted schematically in FIG. 4A and 4B, the combined compressive and shear force can be achieved using a pair of press rolls of the same diameter rotated in tangential relationship but at different angular velocities. This is the presently preferred embodiment of the invention disclosed and claimed herein. As shown in FIG. 4A, rolls 40 and 42 both have the same diameter D but are rotated at different angular speeds $\omega$, where $\omega_1 \neq \omega_2$. As in the previous embodiment, the difference in surface velocities at the point of tangency (point 44) induces a shearing stress in the briquettes being formed in the cooperating sets of cavities 46 and 48 (FIG. 4B) on the peripheries of rolls 40 and 42 respectively. In FIG. 4B, roll 40 is depicted biased against roll 42 as a result of a biasing force applied on shaft 52, however, any suitable biasing arrangement is contemplated as within the scope of the presention invention.

In the briquetting press apparatus shown schematically in FIG. 4B, means are provided for achieving the differential angular velocities of press rolls 40 and 42. In the depicted apparatus the means includes a timing gear assembly 50 which connects drive shafts 52 and 54 and thereby establishes the angular velocity of one with respect to the other. Shafts 52 and 54 are positioned in parallel relationship, and press rolls 40 and 42 are secured to shafts 52 and 54 for rotation therewith in a conventional manner, as described previously. In the apparatus shown in FIG. 4B, motor means 56 drives shaft 54, but it is understood that shaft 52 could be driven in the alternative. Or, motor means 56 could drive the timing gear assembly 50 directly, with shafts 52 and 54 rotating in response to the rotation of gear assembly 50. The rolls, shafts, motors and timing gear assembly are shown mounted on a suitable frame 58 (depicted in dotted lines).

It is important that the rotation of one press roll be synchronized with the other to achieve registration of the cavities. Therefore, although different angular velocities could be achieved with belt or pully drive arrangement, it is preferred to use a toothed gear arrangement for timing gear assembly 50 to prevent slip in the roll drive assembly and ensure registration and cooperation.

Figure 5:
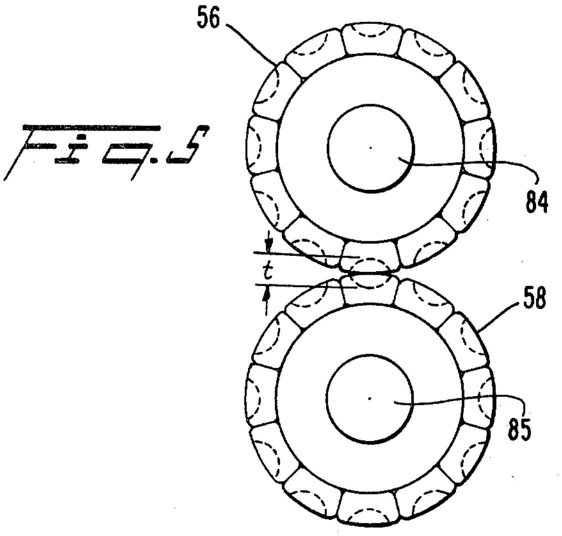
FIG. 5 is an exaggerated end view of another variation of the briquetting rolls of the invention.
Figure 6:
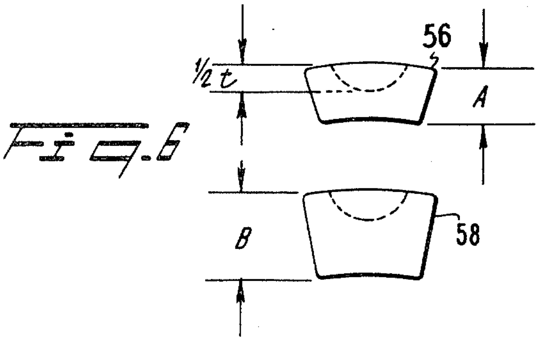
FIG. 6 is an end view of individual segments of a pair of briquetting rolls with different outside diameters.

Important and useful variation of the embodiments of the invention depicted in both FIGS. 1 and 4A and B include forming the press roll from a series of arcuate press roll segments, in a fashion similar to that taught in my patents, U.S. Pat. Nos. 3,907,485 and 4,097,215. As depicted in FIGS. 5 and 6, first and second sets of segments 56, 58 are provided, each set consisting of a plurality of segments which may be arranged end to end around the peripheral surface of and secured to a briquetting press roll core 84 of a conventional briquetting press having rolls designed for use with segments. Each segment in each set has one or more briquette-forming cavities in its outside surface spaced on the segments 56,58 so that when the sets of segments 56,58 are secured to the peripheral surface of respective cooperating press roll cores 84,85, the cavities on the peripheral surfaces of the resulting rolls cooperate to form briquettes when the rolls are rotated tangentially with respect to each other.

In order to achieve the diameter difference in the rolls for the embodiment in FIG. 1, each press roll segment of one set of the variation shown in FIG. 5 has a different thickness than the segments of the other set, assuming both rolls have the same inside diameter. Thus, as seen in FIG. 6, the briquette forming part of the first roll is formed from segments having a thickness A while the second roll is formed from the second set of segments having a thickness B where B>A. For the embodiment of FIGS. 4A and 4B, both sets would have the same thickness.

Figure 3:
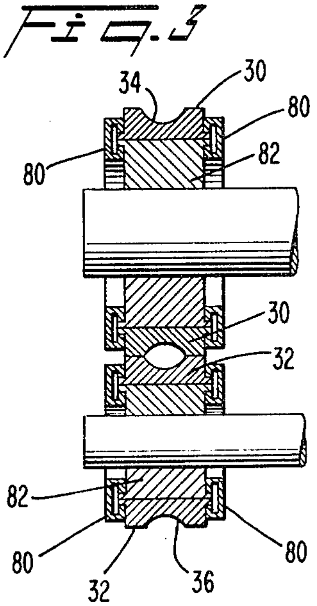
FIG. 3 is a cross sectional view of the embodiment of FIG. 2 taken along line 3—3.

The variation depicted in FIGS. 5 and 6 include means for attaching the sleeves of segments to the rolls or roll cores. While any appropriate means may be used to secure the sleeves or segments to their respective roll or roll core, one such means is depicted schematically in FIG. 3. An angular ring or clamp 80 is secured to each side of the roll core 82 clamping the segments sleeves 30, 32 to the roll core 82. A similar means may be used to secure segments 56 and 58 to their respective roll cores 84,85 in the embodiment of FIG. 5. This means of securing is more fully explained in my U.S. Pat. No. 4,097,215.

Because of the different tangential speeds of rolls having different diameters rotated at the same angular velocity, (embodiment of FIG. 1) or rolls of the same diameter rotated at different angular velocities (embodiment of FIGS. 4A and B), the spacing of the cavities in the peripheral surfaces of the rolls must be different from that of normal rolls. For registration to be ensured, the following relationship must hold:

$$\omega_1 D_1/L_1 = \omega_2 D_2/L_2$$

where $D_1$, and $D_2$ are the roll diameters, $\omega_1, \omega_2$ are the angular velocities, and $L_1$, and $L_2$ are the pitches of the cavity spacings.

Because of the above relationship ensures only that a single point associated with the cavity in one roll, such as the center, will register with a point in the cooperating cavity on the other roll, it is also preferred that the length or size of the cavities in the peripheral direction be chosen to provide registration also of the beginning and end points of the cooperating cavities. This can be done by making the peripheral cavity length on the roll having the higher surface speed longer than the cavity lengths on the other roll. Ideally the ratio of the cavity length l should be about equal to the ratio of the pitches, that is $L_1/L_2$.

Figure 7:
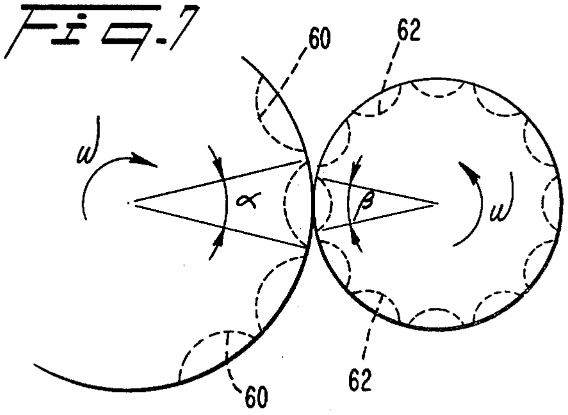
FIG. 7 is a partial cross-section of the rolls of the embodiment of this invention shown in FIG. 1 depicting the size and spacing of the briquette cavities.

Thus, as seen in FIG. 7 for the embodiment wherein the rolls have unequal diameters but rotate at the same angular speeds, the number of cavities 60 will be the same as the number of cavities 62, but the peripheral length of cavities 60 will be greater than the corresponding length of cavities 62. The angle $\alpha$ subtending a cavity 60 will be approximately equal to the corresponding angle $\beta$ for a cavity 62 in this case.

Figure 8:
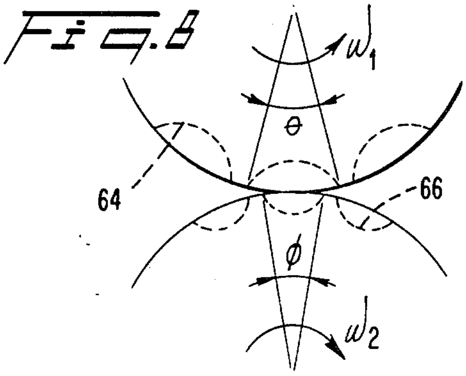
FIG. 8 is a partial cross-section of the rolls of the embodiment of this invention shown in FIG. 4 depicting the size and spacing of the briquette cavities.

For the embodiment of the present invention having rolls of equal diameter rotated at different angular velocities $\omega_1$ and $\omega_2$ where $\omega_1 > \omega_2$, the cavities 64 will have a larger peripheral length than the cavities 66, and the respective substended angles $\theta$ and $\phi$ will not be equal (FIG. 8).

For purposes of ease of design and manufacture, it is preferred that each cavity in the peripheral surface of both rolls be arcuate. These can be formed using ball end mills or other cutters and techniques known in the metal working arts. FIGS. 7 and 8 show arcuate cavities. The briquette release properties of arcuate cavities are favorable.

Although the present invention has been discussed in terms of embodiment in which either the roll diameters were unequal with equal angular velocities (FIG. 1) or the roll diameters were equal but were rotated at unequal angular velocities (FIG. 4), the scope of the present invention also includes the case where both the roll diameters and the roll angular velocities are unequal. This latter embodiment, as well as the embodiments discussed previously, must conform to the following relationships to achieve the disclosed benefits in accordance with the invention:

$$\omega_1 D_1/L_1 = \omega_2 D_2/L_2, \text{ and}$$

$$\omega_1 D_1 \neq \omega_2 D_2$$

In this case it will be appreciated that the following additional relationships must exist:

$$\omega_1 \neq \omega_2$$

$$D_1 \neq D_2$$

$$L_1 \neq L_2.$$

In operation, the pairs of briquetting press rolls 10 and 12 (FIG. 1) and 40 and 42 (FIG. 4) are rotated tangentially with respect to each other in opposite angular directions with unequal surface speeds at the point of tangency. Particulate material is fed between the rotating rolls substantially at their point of tangency to fill the briquette forming molds created by the cooperating cavities 18 and 20, or 46 and 48. As the rolls are biased together, the particulate material is compressed within the briquette mold forming a briquette. Because of the unequal tangential velocities of the roll peripheries a shear stress is imposed on the briquette being formed. It is believed that the shear stress causes greater plastic deformation of isotropic particulate material than is achievable where only hydrostatic force is applied to the briquettes, thus providing briquettes of greater density and strength and reducing the frequency of briquette damage due to "clam shelling."

Experimental data obtained using briquetting rolls having unequal diameter and rotated at the same angular velocities indicate that the increased shear stress imposed upon briquettes being formed in the cooperating cavities increases the average crushing strength of the resulting briquettes. Various materials were formed into briquettes using standard briquetting rolls having equal diameters, equal angular speeds, and the same cavity spacing pitch. Particulate materials of the same composition were then formed into briquettes using special briquetting rolls made in accordance with the present invention, having unequal diameters, the difference in roll diameters being equal to the thickness of the briquettes to be formed.

The press rolls had diameters of about 4.97 inches and 5.22 inches, respectively, and were rotated with the same angular velocity of about 5 RPM. Each roll had 32 cavities equally spaced around the periphery cut with a ½ inch diameter ball end mill. The ratio of the pitches, $L_1/L_2$ was about 0.95. The length of the land between the cavities on each roll was about 0.060 inches, yielding slightly longer cavities on the 5.22 inch roll.

The briquette samples formed provided the following average crushing strength calculated on the basis of 10 individual specimens for each composition tested.

| | | Crushing Strength | |
|---|---|---|---|
| Test No. | Material Formed Into Briquettes | Special Rolls, In Accordance With The Present Invention | Standard Rolls |
| 1 | Nickel powder mixed with 1.5% asphalt emulsion | 282 lbs | 170 lbs |
| 2 | Nickel powder mixed with .5% sulfite liquor | 334 lbs | 284 lbs |
| 3 | Nickel powder mixed with .5% ashland oil 6300/6100 binder | 332 lbs | 138 lbs |
| 4 | Minus 60 mesh Eastern Kentucky coal, no binder | 128 lbs | 95 lbs |

This data indicates that, at least with respect to the particular materials tested, briquetting rolls having a diameter difference equal to the thickness of the resulting briquettes increases the average strength of the briquettes from about 20% to well over 100%.

It will be apparent to those skilled in the art that various modifications and variations could be made without departing from the scope or spirit of the invention.

I claim:

1. In a pair of briquetting press rolls for synchronized rotation in tangential relationship in opposite angular direction by a briquetting press, the improvement wherein:

first and second briquetting press rolls have diameters $D_1$ and $D_2$, respectively, and each has a plurality of briquette-forming cavities spaced about its periphery for registration and cooperation with the cavities of the other roll to form briquettes of particulate material during rotation of the rolls, the spacings of the cavities of said first and second rolls having a circumferential pitch $L_1$ and $L_2$, respectively, said rolls conforming to the relationships $$\frac{D_1\omega_1}{L_1} = \frac{D_2\omega_2}{L_2}, \text{ and}$$

$$\omega_1 D_1 \neq \omega_2 D_2,$$

where $\omega_1$ and $\omega_2$ are the synchronized angular velocities of rotation of said first and second rolls, respectively, whereby a briquette being formed in a pair of said cooperating cavities is subjected to a combined compressive stress and shear stress for increasing the strength and density of the briquette.

2. The improved press rolls as in claim 1 wherein $$\omega_1 = \omega_2.$$

3. The improved press rolls as in claim 1 wherein $$D_1 = D_2.$$

4. The improved press rolls as in claim 1 wherein $$\omega_1 \neq \omega_2,$$

$$D_1 \neq D_2, \text{ and}$$

$$L_1 \neq L_2.$$

5. The improved press rolls as in claim 2 wherein $$1.00 > (L_1/L_2) \geq 0.25.$$

6. The improved press rolls as in claim 5 wherein $L_1/L_2$ is ≧ about 0.91, and <1.00.

7. The improved press rolls as in claim 6 wherein $L_1/L_2$ is about 0.95.

8. The improved press rolls as in claim 1 wherein the cavities in each of said press rolls are arcuate.

9. The improved press rolls as in claim 1 wherein the ratio of the peripheral lengths of said cavities on said press rolls is equal to about $L_1/L_2$.

10. The improved press rolls as in claim 2 wherein the absolute value of the difference between the diameters of said rolls, that is, $|D_1 - D_2|$ is in the range from about t to about 2t, where t is the thickness of the briquette to be formed.

11. The improved press rolls as in claim 2 wherein $D_2$ is about $2D_1$.

12. The press rolls as in claim 1 wherein each of said rolls includes an inner core and a plurality of detachable outer roll segments, said cavities being formed in the detachable segments, and wherein the press rolls further includes means for securing said segments to said inner core.

13. A briquetting press for briquetting particulate material, the press comprising:

(a) a pair of press rolls for synchronized rotation in tangential relationship in opposite angular directions, each of said rolls having a plurality of briquette-forming cavities spaced about its periphery; and (b) means for moving the periphery of one of said press rolls at a tangential velocity different from that of the periphery of the other of said press rolls at the point of tangency and for providing registration between the cavities on said one roll with the cavities on said other roll at the point of tangency, the difference in tangential velocity providing a shear force on the particulate material being formed into briquettes.

14. The briquetting press as in claim 13 wherein said means includes said one roll and said other roll having diameters $D_1$ and $D_2$, respectively; the pitches of the cavities on said one roll and said other roll being $L_1$ and $L_2$, respectively; and said one roll and said other roll being driven at angular velocities $\omega_1$ and $\omega_2$ respectively, and wherein the following relationships are satisfied:

$$\frac{D_1\omega_1}{L_1} = \frac{D_2\omega_2}{L_2}, \text{ and}$$

$$\omega_1 D_1 \neq \omega_2 D_2.$$

15. The briquetting press as in claim 14 wherein $$\omega_1 = \omega_2.$$

16. The briquetting press as in claim 14 wherein $$D_1 = D_2.$$

17. The briquetting press as in claim 14 wherein $$\omega_1 \neq \omega_2,$$

$$D_1 \neq D_2, \text{ and}$$

$$L_1 \neq L_2.$$

18. The briquetting press as in claim 15 wherein $$1.00 > (L_1/L_2) > 0.25.$$

19. The briquetting press as in claim 18 wherein $L_1/L_2$ is ≧ about 0.91, and <1.00.

20. The briquetting press as in claim 19 where $L_1/L_2$ is about 0.95.

21. The briquetting press as in claim 14 wherein the cavities in each of said press rolls are arcuate.

22. The briquetting press as in claim 14 wherein the ratio of the peripheral lengths of said cavities on said briquetting press rolls is equal to about $L_1/L_2$.

23. The briquetting press as in claim 15 wherein $|D_1-D_2|$ is in the range from about t to 2t, where t is the thickness of the briquettes to be formed.

24. The briquetting press as in claim 15 wherein $D_2$ is about $2D_1$.

25. The press rolls as in claim 14 wherein each of said rolls includes an inner core and a plurality of detachable outer roll segments, said cavities being formed in the detachable segments, and wherein the press rolls further includes means for securing said segments to said inner core.

26. A briquetting press for briquetting particulate material, the press comprising:

(a) a pair of press rolls for synchronized rotation in tangential relationship in opposite angular directions, each of said rolls having a plurality of briquette-forming cavities spaced about its periphery;
(b) means for moving the periphery of one of said press rolls at a tangential velocity different from that of the periphery of the other of said press rolls at the point of tangency and for providing registration and cooperation between the cavities on said one roll with the cavities on said other roll at the point of tangency, the difference in tangential velocity providing a shear force on the particulate material being formed into briquettes, wherein said one roll and said other roll have equal diameters, and the pitches of the spacings of the cavities on said one roll and said other roll are $L_1$ and $L_2$, respectively; and
(c) means for driving said one roll at an angular velocity $\omega_1$ different from the angular velocity $\omega_2$ of said other roll, the following relationship being maintained:

$$\omega_1/L_1 = \omega_2/L_2.$$

27. The briquetting press as in claim 26 wherein said driving means includes a pair of drive shafts, each of said shafts secured to a respective one of said rolls, and wherein said driving means further includes timing gear means coupling said shafts for interdependent, synchronized rotation.

28. A briquetting press for the formation of briquettes of particulate material, comprising:

(a) a frame;
(b) a pair of shafts journalled for synchronized rotation in said frame in substantially parallel relationship;
(c) means for concurrently rotating said shafts;
(d) first and second briquetting rolls each having a plurality of arcuate briquette forming cavities spaced about its periphery and each of said rolls being secured to one end of a respective one of said shafts for rotation in tangential relationship to the other of said rolls, the cavities of said first roll registering and cooperating with the cavities of said second roll substantially in the plane of tangency of said rolls for forming briquettes during rotation of said rolls;
(e) means for biasing said rolls together at their point of tangency, wherein the diameter of said first and second rolls, $D_1$, $D_2$; the circumferential pitch of the spacings of each of the cavities of said first and second rolls, $L_1$, $L_2$; and the angular velocity of rotation of said first and second rolls, $\omega_1, \omega_2$, conform to the relationships $$\frac{D_1\omega_1}{L_1} = \frac{D_2\omega_2}{L_2}, \text{ and}$$

$$\omega_1 D_1 \neq \omega_2 D_2.$$

29. The briquetting press as in claim 28 wherein $D_1 = D_2$, and wherein said means for concurrently rotating said shafts includes means for coupling said shafts for interdependent, synchronized rotation at different angular speeds.

30. The briquetting press as in claim 28 wherein $\omega_1 = \omega_2$ and wherein the diameters of said pair of shafts are equal, said first and second rolls comprising a pair of detachable sleeves having substantially equal inner diameters sized for slip fit on the said shafts, the press further comprising means for securing each of said sleeves to a respective one of said shafts, the outside diameter of said sleeves being unequal for providing different peripheral velocities in the plane of tangency.

31. A method of manufacturing briquettes of particulate material, comprising:

(a) positioning first and second briquetting press rolls for rotation in tangential relationship, said rolls having diameters $D_1$ and $D_2$, respectively, and having a plurality of briquette-forming cavities spaced about the peripheral surface of each of said first and second rolls, the spacings of said cavities having a circumferential pitch $L_1$ and $L_2$, respectively;
(b) rotating said first and second rolls at synchronized angular velocities $\omega_1$ and $\omega_2$, respectively, in opposite angular directions for registration and cooperation of said first and second roll cavities at the point of tangency of said rolls;
(c) feeding the particulate material into said cooperating cavities during rotation of said rolls; and
(d) biasing said rolls together at the point of tangency to form said particulate material into briquettes, wherein $$\frac{D_1\omega_1}{L_1} = \frac{D_2\omega_2}{L_2}\text{, and}$$

$\omega_1 D_1 \neq \omega_2 D_2$, whereby the forces acting on a briquette during formation in cooperating cavities have compressive and shear components.

32. The method of claim 31 wherein $D_1 \neq D_2$, $L_1 \neq L_2$ and $\omega_1 = \omega_2$.

33. The method of claim 31 wherein $D_1 = D_2$, $L_1 \neq L_2$ and $\omega_1 \neq \omega_2$.

34. The method of claim 31 wherein $D_1 \neq D_2$, $L_1 \neq L_2$ and $\omega_1 \neq \omega_2$ and wherein $D_1 > D_2$, $L_1 < L_2$ and $\omega_1 < \omega_2$.

* * * * *

UNITED STATES PATENT AND TRADEMARK OFFICE
CERTIFICATE OF CORRECTION

PATENT NO. : 4,249,878

DATED : February 10, 1981

INVENTOR(S) : Karl R. Komarek

It is certified that error appears in the above-identified patent and that said Letters Patent are hereby corrected as shown below:

Claim 14, line 6, after "at" insert --synchronized--.

Signed and Sealed this

*Twelfth* Day of *May 1981*

[SEAL]

*Attest:*

RENE D. TEGTMEYER

*Attesting Officer*

*Acting Commissioner of Patents and Trademarks*